(12) United States Patent
Hu (10) Patent No.: US 11,106,450 B2
(45) Date of Patent: Aug. 31, 2021

(54) INFORMATION EXTRACTION APPARATUS, AND AUTOMATIC FIRMWARE UPDATE SYSTEM AND METHOD FOR EMBEDDED SYSTEM

(71) Applicant: Getac Technology Corporation, Hsinchu County (TW)

(72) Inventor: Chien-Chih Hu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 22 days.

(21) Appl. No.: 16/373,794

(22) Filed: Apr. 3, 2019

(65) Prior Publication Data

US 2020/0104112 A1    Apr. 2, 2020

Related U.S. Application Data

(60) Provisional application No. 62/738,201, filed on Sep. 28, 2018.

(51) Int. Cl.
| | |
|---|---|
| *G06F 9/44* | (2018.01) |
| *G06F 8/65* | (2018.01) |
| *H04L 29/08* | (2006.01) |
| *G06F 9/4401* | (2018.01) |

(52) U.S. Cl.
CPC .............. *G06F 8/65* (2013.01); *G06F 9/4401* (2013.01); *H04L 67/34* (2013.01)

(58) Field of Classification Search
CPC .......... G06F 8/65; G06F 9/4401; H04L 67/34
USPC ................................................ 717/168–178
See application file for complete search history.

(56) References Cited

U.S. PATENT DOCUMENTS

| | | | | |
|---|---|---|---|---|
| 6,199,204 B1 * | 3/2001 | Donohue | .................. | G06F 8/65 705/59 |
| 6,353,926 B1 * | 3/2002 | Parthesarathy | ........... | G06F 8/65 707/999.202 |
| 8,880,049 B2 * | 11/2014 | Furuta | ....................... | G06F 8/65 455/418 |

(Continued)

OTHER PUBLICATIONS

Brown et al., "Software Updating in Wireless Sensor Networks: A Survey and Lacunae", 2013, Journal of Sensor and Actuator Networks, www.mdpi.com/journal/jsan/, pp. 717-760. (Year: 2013).*

(Continued)

*Primary Examiner* — Ted T. Vo
(74) *Attorney, Agent, or Firm* — Locke Lord LLP; Tim Tingkang Xia, Esq.

(57) ABSTRACT

An automatic firmware update method for an embedded system includes establishing wireless communication between an application layer of the embedded system and a remote server, detecting a version of firmware stored in the remote server corresponding to the embedded system while the wireless communication is established, downloading the firmware in a new version and an update policy when the firmware in the new version is available, storing the downloaded firmware in the new version and the downloaded update policy in a storage unit, issuing an update notification according to an update object of the downloaded firmware in the new version, reading the update policy according to the update notification, and performing an update procedure for updating the firmware to the new version according to the read update policy.

18 Claims, 7 Drawing Sheets

(56) References Cited

U.S. PATENT DOCUMENTS

| | | | | |
|---|---|---|---|---|
| 9,183,393 | B2* | 11/2015 | Djabarov | G06F 21/572 |
| 9,747,096 | B2* | 8/2017 | Searle | H04L 41/082 |
| 10,581,850 | B2* | 3/2020 | Conrad | H04L 9/0891 |
| 2006/0069753 | A1* | 3/2006 | Hu | H04L 67/34 |
| | | | | 709/220 |
| 2018/0018161 | A1* | 1/2018 | Gattu | G06F 8/656 |

OTHER PUBLICATIONS

Jurkovic et al., "Remote Firmware Update for Constrained Embedded Systems", 2014, downloaded from IEEE Xplore, pp. 1019-1023. (Year: 2014).*

Xuan Gu et al., "Selective Data Replication for Distributed Geographical Data Sets", 2008, ACM, 4 pages. (Year: 2008).*

* cited by examiner

INFORMATION EXTRACTION APPARATUS, AND AUTOMATIC FIRMWARE UPDATE SYSTEM AND METHOD FOR EMBEDDED SYSTEM

CROSS-REFERENCE TO RELATED APPLICATIONS

This application claims priority from U.S. Patent Application Ser. No. 62/738,201 filed on Sep. 28, 2018, the entire disclosure of which is hereby incorporated by reference.

BACKGROUND OF THE INVENTION

Field of the Invention

The present invention relates to an information extraction apparatus, and an automatic firmware update method for an embedded system and an automatic firmware update system thereof.

Description of the Prior Art

Firmware is a type of software embedded in a hardware device, and is usually located in a flash memory or a read-only memory (ROM) in an application-specific integrated circuit (ASIC) or a programmable logic device (PLD). Firmware is extensively applied in electronic products, and achieves an intended designed function by collaborative operations established between software and hardware using firmware designed by a developing manufacturer of an electronic product. Further, before an electronic product is shipped out of the factory, the foregoing developing manufacturer also conducts tests on the electronic product to verify whether the electronic product is functional. If any abnormality is discovered during the verification process, debugging needs to be performed to ensure that the electronic product can operate normally after it is sold to a consumer.

However, with the ever-increasingly complicated functions of current electronic products, it is extremely difficult to verify all functions during a development process, and some errors not found during the development phase may be discovered after actual use of consumers. At this point in time, firmware in the electronic products needs to be modified, that is, firmware needs to be updated, in order to correct the errors. Therefore, a user of the electronic products needs to initiatively find the corresponding electronic product from a webpage of a developing manufacturer or a vendor of the electronic product to check if an updated version of the firmware is available. If the manufacturer or vendor releases the firmware in a new version, the user needs to initiatively download the firmware in the new version to the electronic product to perform update of the firmware, and the user cannot use the electronic product during the update procedure, hence causing inconvenience.

SUMMARY OF THE INVENTION

In one embodiment, an automatic firmware update method for an embedded system includes establishing wireless communication between an application layer of the embedded system and a remote server, detecting a version of firmware stored in the remote server corresponding to the embedded system while the wireless communication is established, downloading the firmware in a new version and an update policy when the firmware in the new version is available, storing the downloaded firmware in the new version and the downloaded update policy in a storage unit, issuing an update notification according to an update object of the downloaded firmware in the new version, reading the update policy according to the update notification, and performing an update procedure for updating the firmware to the new version according to the read update policy.

In one embodiment, an information extraction apparatus includes a camera component, a storage unit, a network module and a processing unit. The camera component captures an ambient environment to generate an environment image stream presenting the ambient environment. The storage unit stores the environment image stream. The processing unit is coupled to the storage unit and the network module. The processing unit includes an application layer and a middleware. The application layer detects a version of firmware stored in a remote server corresponding to the embedded system by using the network module, and downloads and stores the firmware in a new version and an update policy in a storage unit when the firmware in the new version is available. The middleware reads the update policy upon receipt of an update notification from the application layer, and performs an update procedure for updating the firmware to the new version according to the update policy.

In one embodiment, an automatic firmware update system for an embedded system includes a storage unit, an application layer and a middleware. The application layer establishes wireless communication with a remote server, detects a version of firmware stored in the remote server corresponding to the embedded system while the wireless communication is established, downloads the firmware in a new version and an update policy when the firmware in the new version is available, stores the downloaded firmware in the new version and the downloaded update policy in a storage unit, and issues an update notification according to an update object of the firmware in the new version. The middleware receives the update notification from the application layer, reads the update policy upon receipt of the update notification, and performs an update procedure for updating the firmware to the new version according to the update policy.

DETAILED DESCRIPTION OF THE EMBODIMENTS

Figure 1:
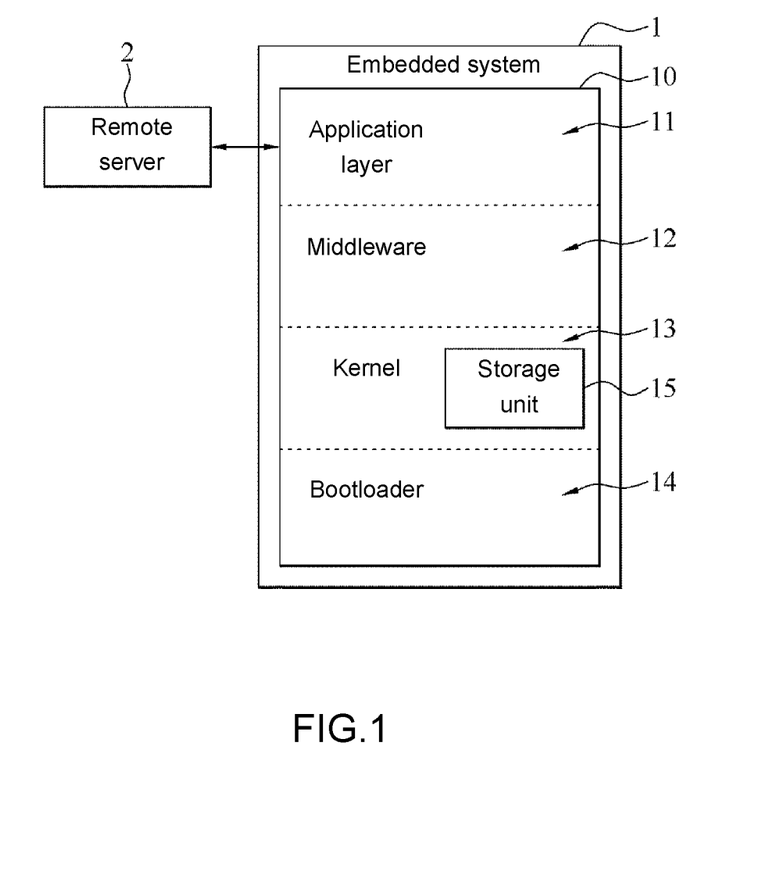
FIG. 1 is a block diagram of an embedded system according to an embodiment of the present invention.

FIG. 1 shows a block diagram of an embedded system according to an embodiment of the present invention. Referring to FIG. 1, the embedded system 1 includes an automatic firmware update system 10. The automatic firmware update system 10 can be connected via wireless communication to a remote server 2 having therein a firmware in a version corresponding to the embedded system 1, and can perform an update procedure for updating the firmware of the embedded system 1 to a new version.

The automatic firmware update system 10 of the embedded system 1 includes an application layer 11, a middleware 12 connected to the application layer 11, and a storage unit 15. The application layer 11 can wirelessly communicate with the remote server 2 to detect the version of firmware stored in the remote server 2 corresponding to the embedded system 1, and determine whether to perform an update procedure for updating the firmware in the embedded system 1 to a new version according to whether the version of the firmware is updated to the new version.

Figure 2:
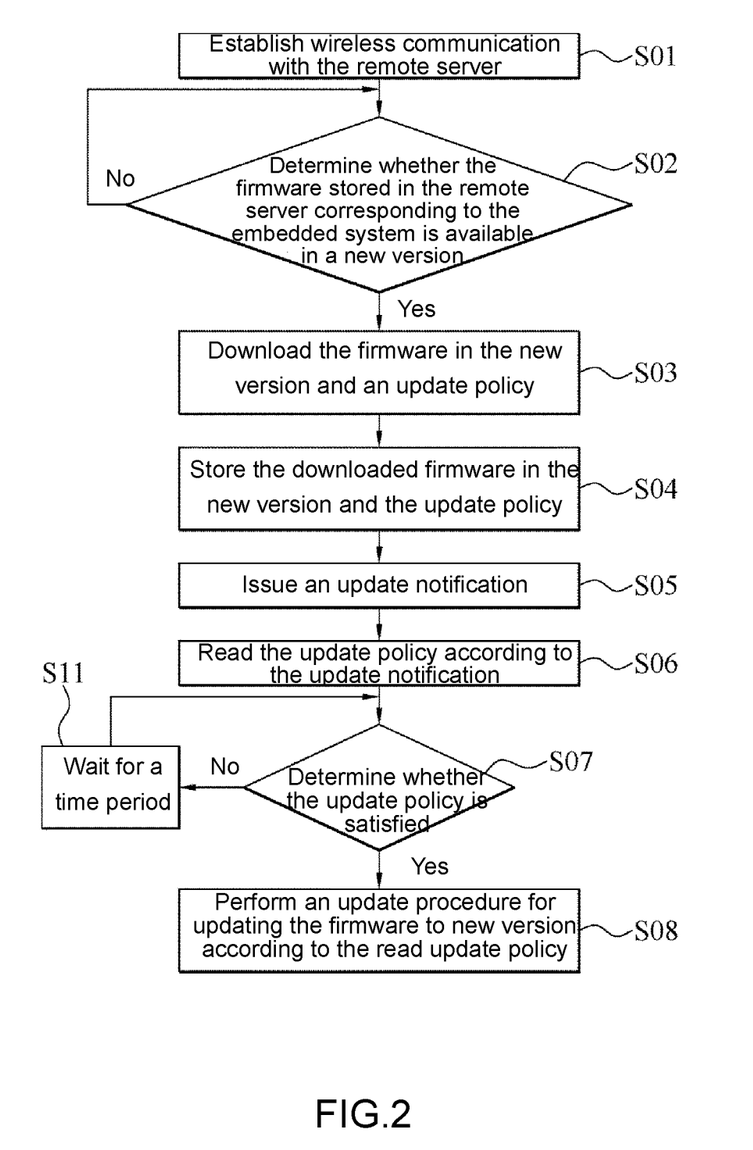
FIG. 2 is a flowchart of an automatic firmware update method for an embedded system according to an embodiment of the present invention.

Refer to FIG. 1 and FIG. 2. FIG. 2 shows a flowchart of an automatic firmware update method for an embedded system according to an embodiment of the present invention. During an operation, the application layer 11 first establishes wireless communication therefrom with the remote server 2 (step S01). While the wireless communication is established, the version of firmware stored in the remote server 2 corresponding to the embedded system 1 is detected by the application layer 11 (step S02) to determine whether the version of the firmware stored in the remote server 2 corresponding to the embedded system 1 is updated. For example, the application layer 11 can compare whether the version number for the firmware currently run in the embedded system 1 is the same as the version number of the firmware stored in the remote server 2 corresponding to the embedded system 1, so as to determine whether there is a new version for the firmware stored in the remote server 2 corresponding to the embedded system 1. When the application layer 11 determines that a new version of the firmware is released and available (the determination result is "yes"), the application layer 11 downloads the firmware in the new version and an update policy from the remote server 2 (step S03), and stores the downloaded firmware in the new version and the downloaded update policy in the storage unit 15 (step S04). Further, the application layer 11 issues an update notification to the middleware 12 according to an update object of the firmware in the new version (step S05), and the middleware 12 reads the update policy from the storage unit 15 according to the update notification (step S06) and then determines whether the update policy is satisfied (step S07). When the update policy is satisfied (the determination result is "yes"), it means that an update procedure for updating the firmware to the new version can be currently performed, and the middleware 12 starts the update procedure for updating firmware to the new version (step S08).

Thus, a developing manufacturer of the embedded system 1 can define an update policy, and upload the firmware in the new version and the defined update policy to the remote server 2. The automatic firmware update system 10 can automatically download the firmware in the new version from the remote server 2 and automatically perform the update procedure for updating the firmware to the new version when the update policy is satisfied. A user of the embedded system 1 is not required to initiatively determine whether the version of the firmware in the embedded system 1 is updated or manually download the firmware in the new version from the remote server 2, nor is the user required to contemplate when is the best timing for performing the update procedure for updating the firmware to the new version. As such, the ease of use of the embedded system 1 is immensely enhanced, and the version of the firmware in the embedded system 1 is constantly kept in the latest version so as to improve the stability of the embedded system 1.

In some embodiments, the remote server 2 has a mapping table (as shown in Table—1) stored therein. The mapping table records multiple update policies and current versions of the firmware of multiple embedded systems 1 supported by the remote server 2 and defined by a developing manufacturer. Accordingly, when wireless communication is established between the embedded system 1 and the remote server 2, the automatic firmware update system 10 can automatically look up the mapping table stored in the remote server 2, and determine whether update needs to be performed according to the corresponding update policy and the current version of the firmware in the mapping table, so as to further automatically download the firmware in the new version from the remote server 2 and to automatically perform the update procedure for updating the firmware to the new version when the update policy is satisfied.

TABLE 1

| Version of firmware | Type of device[#] | Update policy |
|---|---|---|
| 0.1 | 5 | 1111.xml |
| 2.2 | 5 | 000.xml |
| 0.5 | 5 | 333.xml |

[#]The evolution type of the device in the embedded system 1, e.g., a 5th-generation product.

In one embodiment, when the update policy is not satisfied (the determination result is "no"), the middleware 12 can wait for a time period (step S11) and again determine whether the update policy is satisfied once the time period ends. For example, the time period can be 30 seconds, that is, the middleware 12 can determine once every 30 seconds after receiving the update notification whether the update policy is satisfied.

Furthermore, the update policy can be when the embedded system 1 is in a non-low power state or when the embedded system 1 is not performing data synchronization with the remote server 2. More specifically, when the embedded system 1 is in a low power state or when the embedded system 1 is performing data synchronization with the remote server 2, the automatic firmware update system 10 does not perform the update procedure for updating the firmware to the new version; only when the embedded system 1 exits the low power state or the data synchronization with the remote server 2 is terminated, the automatic firmware update system 10 then starts the update procedure for updating the firmware to the new version. Thus, issues of shutting down of the embedded system 1 caused by insufficient power during the update procedure for updating the firmware to the new version and hence malfunction of the embedded system 1 due to incomplete firmware update, or data loss caused by interrupted data synchronization between the embedded system 1 and the remote server 2 as a result of the update procedure for updating the firmware to the new version, can be avoided.

Figure 3:
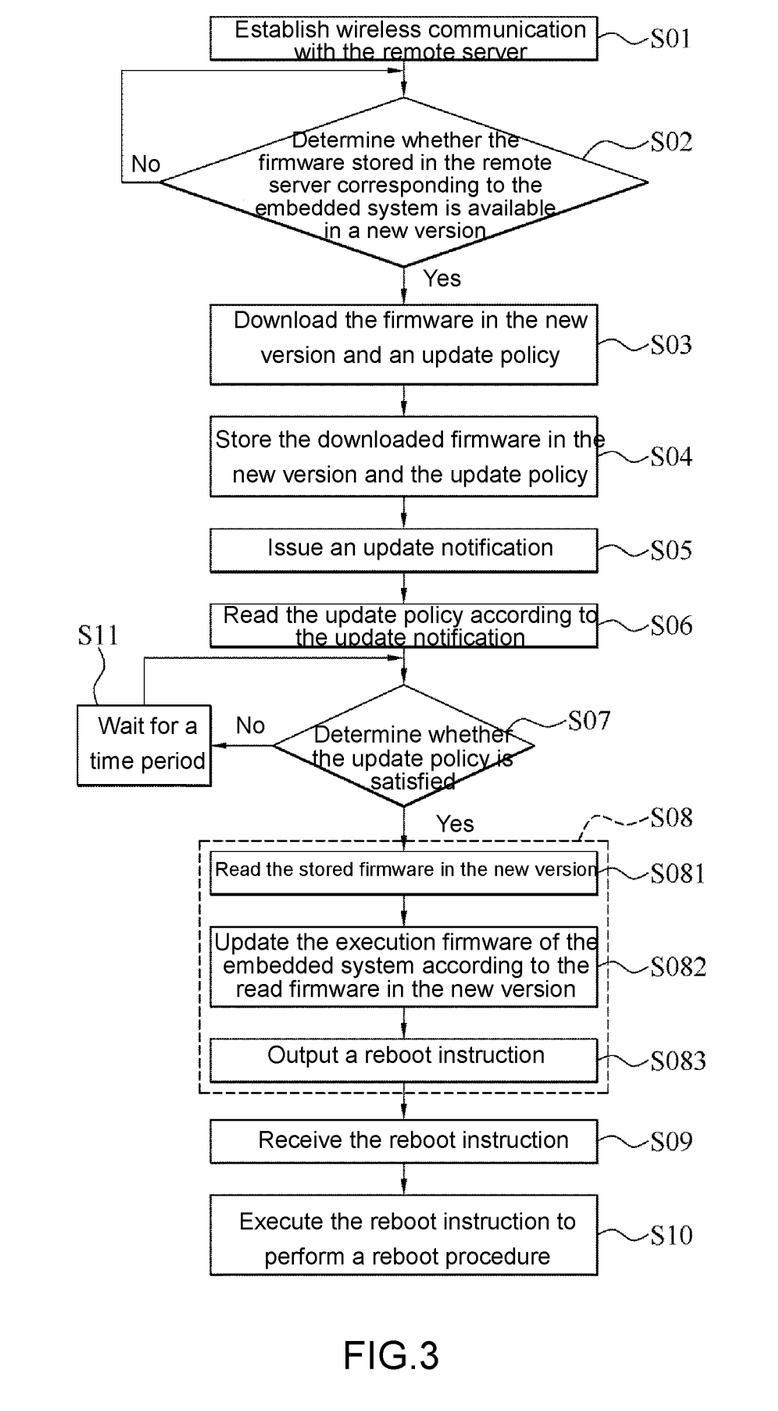
FIG. 3 is a flowchart of another embodiment of the automatic firmware update method in FIG. 2.

In one embodiment, the update object of updating the firmware to the new version can be execution firmware of the entire embedded system 1, that is, the embedded system 1 needs to be rebooted after the update procedure of the execution firmware is complete. Accordingly, as shown in FIG. 1, the automatic firmware update system 10 of the embedded system 1 further includes a kernel 13 and a bootloader 14. The kernel 13 is connected between the middleware 12 and the bootloader 14. During an operation, referring to FIG. 1 and FIG. 3, when the update policy read by the middleware 12 according to the update notification is satisfied, in step S08, the middleware 12 reads the stored firmware in the new version from the storage unit 15 (step S081), updates the execution firmware of the embedded system 1 according to the read firmware in the new version (step S082), and outputs a reboot instruction after the execution firmware of the embedded system 1 is updated completely (step S083). The kernel 13 receives the reboot instruction from the middleware 12 after the execution firmware of the embedded system 1 is updated completely (step S09), and executes the reboot instruction to enable the bootloader 14 to perform a reboot procedure of the embedded system 1 (step S10), allowing the embedded system 1 to reboot and operate according to the firmware in the new version after the execution firmware thereof is updated completely, thus completing the update procedure for the execution firmware of the embedded system 1.

Figure 4:
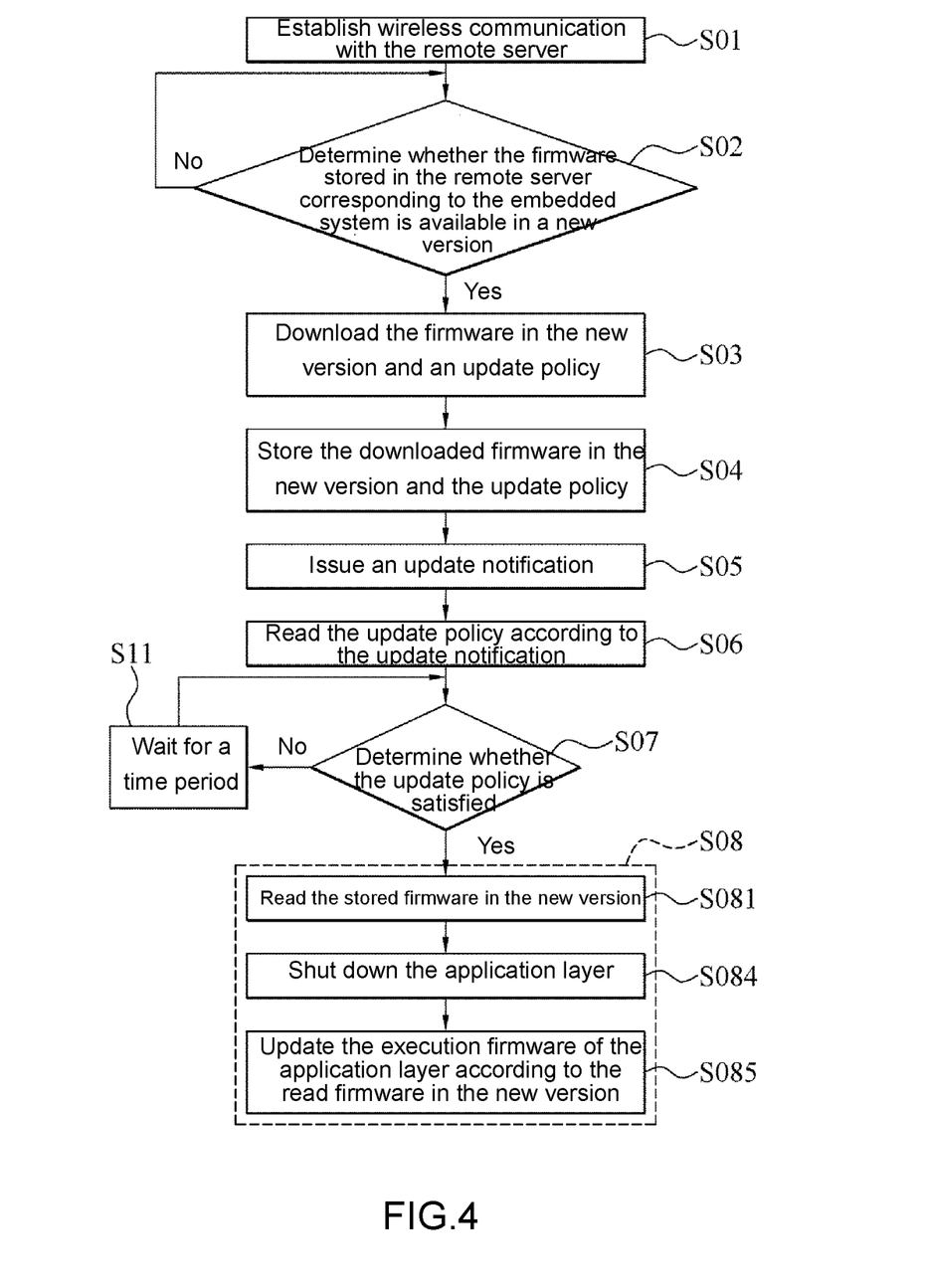
FIG. 4 is a flowchart of yet another embodiment of the automatic firmware update method in FIG. 2.

In another embodiment, the update object of updating the firmware to the new version can also be only the execution firmware of the application layer 11; that is to say, after the update procedure for the execution firmware of the application layer 11 is complete, only the application layer 11 needs to be shut down instead of rebooting the embedded system 1. Correspondingly, referring to FIG. 1 and FIG. 4, when the update policy read by the middleware 12 according to the update notification is satisfied, in step S08, the middleware 12 reads the stored firmware in the new version from the storage unit 15 (step S081), the middleware 12 subsequently shuts down the application layer 11 (step S084), and after the application layer 11 is shut down, the middleware 12 updates the execution firmware of the application layer 11 according to the read firmware in the new version (step S085), thus completing the update procedure for the execution firmware of the application layer 11. The application layer 11 is again activated after being shut down, and operates according to the updated firmware in the new version.

Figure 5:
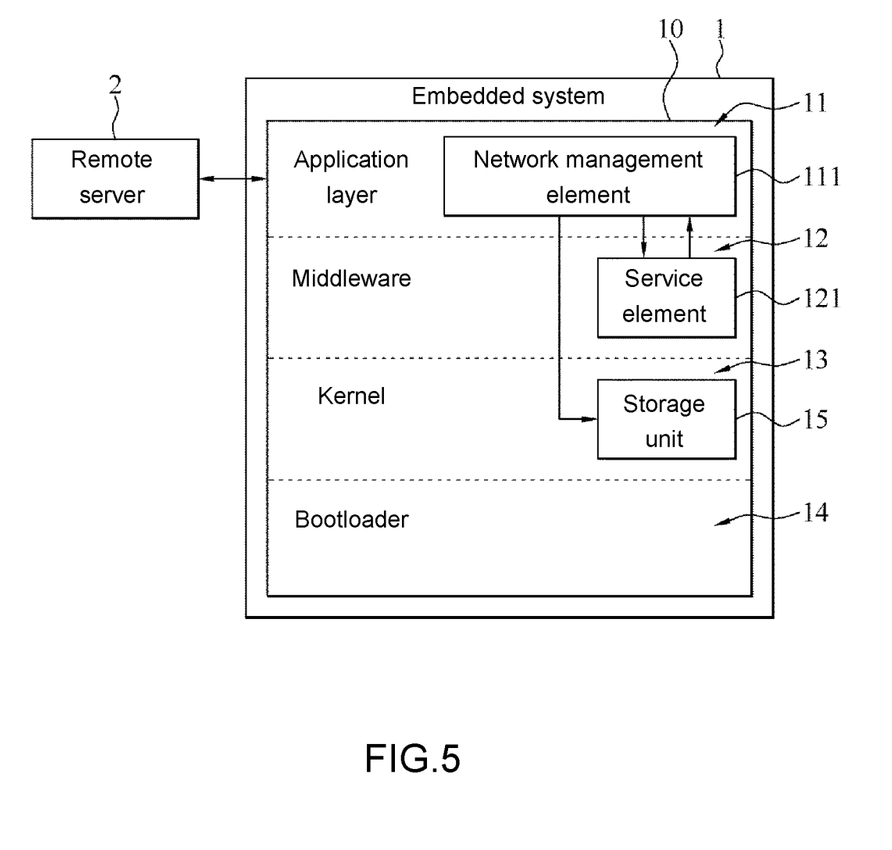
FIG. 5 is a block diagram of another embodiment of the embedded system in FIG. 1.

FIG. 5 shows a block diagram of another embodiment of the embedded system in FIG. 1. As shown in FIG. 5, the embedded system 1 further includes a network management element 111 controlled by the application layer 11 and a service element 121 controlled by the middleware 12, and the update procedure for the execution firmware of the application layer 11 can be performed by the network management element 111 and the service element 121. More specifically, referring to FIG. 4 and FIG. 5, the network management element 111 first establishes wireless communication therefrom with the remote server 2 (step S01). While the wireless communication is established, the network management element 111 determines whether the remote server 2 has the firmware in the new version corresponding to the embedded system 1 (step S02). When it is determined that the firmware in the new version is available in the remote server 2, the network management element 111 downloads the firmware in the new version and an update policy from the remote server 2 (step S03), and stores the firmware in the new version and the update policy in the storage unit 15 (step S04). The network management element 111 then sends an update notification to the service element 121 controlled by the middleware 12 (step S05), and the service element 121 reads the update policy according to the update notification (step S06) and determines whether the update policy is satisfied. When the update policy is satisfied, in step S08, the service element 121 reads the stored firmware in the new version from the storage unit 15 (step S081), shuts down the application layer 11 (step S084), and updates the execution firmware of the application layer 11 after the application layer 11 is shut down (step S085), thereby completing the update procedure for the execution firmware of the application layer 11 by the network management element 111 and the service element 121.

Figure 6:
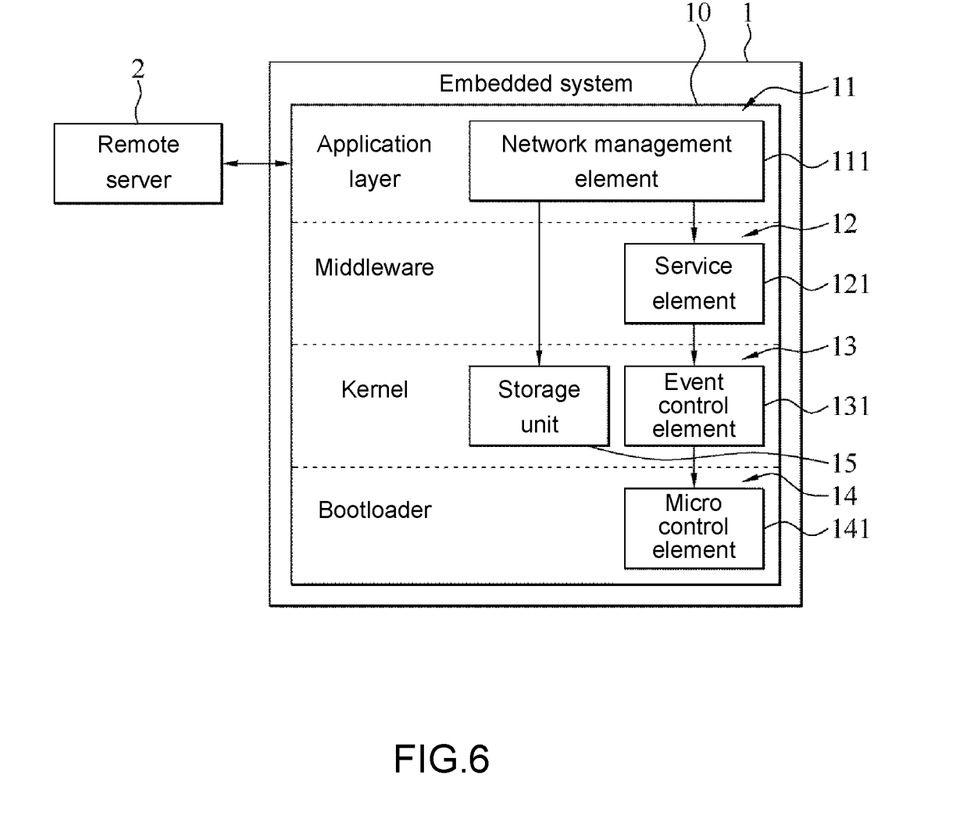
FIG. 6 is a block diagram of yet another embodiment of the embedded system in FIG. 1.

FIG. 6 shows a block diagram of yet another embodiment of the embedded system in FIG. 1. As shown in FIG. 6, the embedded system 1 further includes an event control element 131 controlled by the kernel 13 and a micro control element 141 controlled by the bootloader 14. By the network management element 111, the service element 121, the event control element 131 and the micro control element 141, the update procedure for the execution firmware of the entire embedded system 1 can be carried out. More specifically, referring to FIG. 3 as well as FIG. 6, the network management element 111 first establishes wireless communication therefrom with the remote server 2 (step S01). While the wireless communication is established, the network management element 111 determines whether the remote server 2 has firmware in a new version corresponding to the embedded system 1 stored therein (step S02). When it is determined that the firmware in the new version is present at the remote server 2, the network management element 111 downloads the firmware in the new version and an update policy from the remote server 2 (step S03), stores the firmware in the new version and the update policy in the storage unit 15 (step S04), and then sends an update notification to the service element 121 controlled by the middleware 12 (step S05). The service element 121 then reads the update policy according to the update notification (step S06) and determines whether the update policy is satisfied. When the update policy is satisfied, in step S08, the service element 121 reads the stored firmware in the new version from the storage unit 15 (step S081), and subsequently performs an update procedure for the execution firmware of the embedded system 1 (step S082). After the update procedure is complete, the service element 121 outputs a reboot instruction (step S083), the event control element 131 receives the reboot instruction from the service element 121 (step S09) and executes the reboot instruction, so as to control the micro control element 141 to perform a reboot procedure of the embedded system 1 (step S10). In one embodiment, the micro control element 141 can be a microprocessor.

Figure 7:
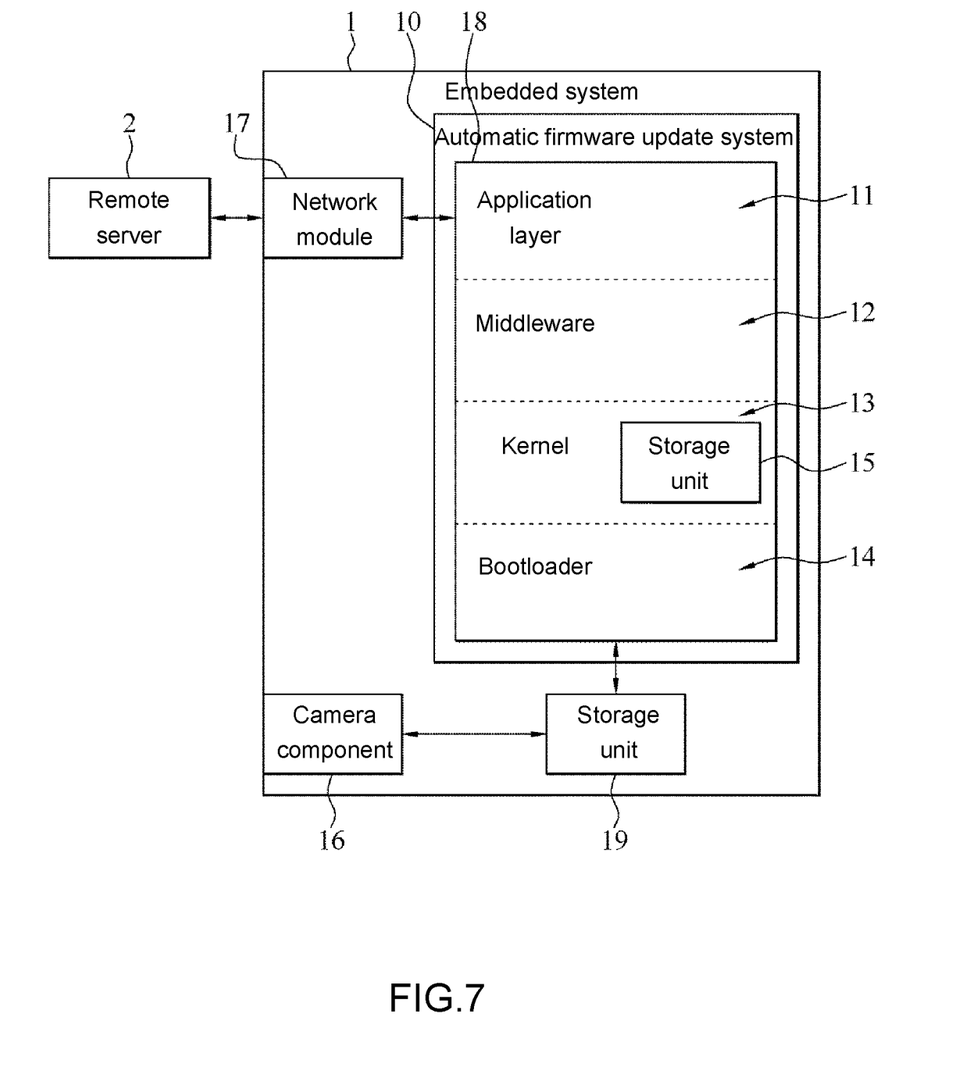
FIG. 7 is a block diagram of an implementation of an information extraction apparatus according an embodiment of the present invention.

In one embodiment, the embedded system 1 can be an information extraction apparatus, e.g., a body-worn camera. Referring to FIG. 7, the embedded system 1 exemplified by an information extraction apparatus includes a camera component 16, a network module 17, a processing unit 18 and a storage unit 19. The processing unit 18 is coupled to the storage unit 19 and the network module 17, and includes the foregoing automatic firmware update system 10; that is, the processing unit 18 accordingly includes the application layer 11, the middleware 12, the kernel 13 and the bootloader 14. The application layer 11 can perform steps S01, S02 and S03 through a connection between the network module 17 and the remote server 2. Operation details of the middleware 12, the kernel 13 and the bootloader 14 included in the processing unit 18 are as described above, and are omitted herein. The camera component 16 captures an ambient environment to generate an environment image stream presenting the ambient environment, and the camera component 16 can store the generated environment image stream in the storage unit 19. At this point, a developing manufacturer of the embedded system 1 exemplified by an information extraction apparatus can define an update policy according to the operation of the camera component 16. For example, the update policy can be when the camera component 16 is not performing a capturing operation or when the camera component 16 is not performing a stream storage operation of storing the environment image stream in the storage unit 19. As such, while the camera component 16 performs the capturing operation and the stream storage operation, the processing unit 18 does not perform the update procedure of updating the firmware to the new version; when the camera component 16 stops the capturing operation and stops the stream storage operation, the processing unit 18 then automatically updates the firmware to the new version, thus preventing the update procedure for updating the firmware to the new version from causing a failure in capturing or storing the environment image stream.

In one embodiment, the storage units 15 and 19 can be two storage elements respectively having a data storage function, e.g., two non-volatile memories. Alternatively, the storage units 15 and 19 can be different data storage regions of the same storage element, e.g., different data storage regions designated by different addresses in the same non-volatile memory.

In one embodiment, taking an information extraction apparatus as the embedded system 1 for instance, the foregoing update policy can be when the camera component 16 of the embedded system 1 is not in an information extraction state or when the camera component 16 is not performing an information storage operation of storing the environment image stream in the storage unit 15.

In conclusion, in an information extraction apparatus, and an automatic firmware update method of an embedded system and an automatic firmware update system thereof according to an embodiment, the automatic firmware update system is capable of automatically downloading firmware in a new version from a remote server and automatically performing an update procedure for updating firmware to the new version when an update policy is satisfied. Thus, a user of the embedded system is not required to initiatively determine whether the firmware of the embedded system is updated to a new version or to manually download the firmware in the new version from the remote server, nor is the user required to contemplate a best timing for performing the update procedure for updating the firmware to the new version. Therefore, the ease of use of the embedded system is immensely enhanced, and the version of the firmware in the embedded system can be constantly kept in the latest version so as to improve the stability of the embedded system.

While the present invention has been disclosed by way of the embodiments above, it is to be understood that the invention is not limited thereto. Some variations and modifications to the embodiments can be made by a person skilled in the art without departing from the spirit and scope of the present invention. Therefore, the legal protection for the present disclosure should be defined by the appended claims.

What is claimed is:

1. An automatic firmware update method for an embedded system, comprising:
   establishing wireless communication between an application layer of the embedded system and a remote server;
   detecting a version of firmware stored in the remote server corresponding to the embedded system while the wireless communication is established;
   downloading the firmware in a new version and an update policy when the firmware in the new version is available;
   storing the downloaded firmware in the new version and the downloaded update policy in a storage unit;
   prior to starting an update procedure, issuing an update notification according to an update object of the downloaded firmware in the new version;
   after issuing the update notification, reading the update policy according to the update notification;
   determining whether the update policy is satisfied, wherein the update policy includes a power state of the embedded system, a data synchronization status of the embedded system with the remote server, and an operation status of the embedded system; and
   in response to determining that the update policy is satisfied, performing the update procedure for updating the firmware to the new version according to the read update policy.

2. The automatic firmware update method for an embedded system according to claim 1, further comprising:
   receiving a reboot instruction from a middleware when the update procedure is complete; and
   executing the reboot instruction to enable a bootloader to perform a reboot procedure.

3. The automatic firmware update method for an embedded system according to claim 2, wherein the step of performing the update procedure for updating the firmware to the new version comprises:
   reading the stored firmware in the new version;
   updating execution firmware of the embedded system according to the read firmware in the new version; and
   outputting the reboot instruction after the execution firmware is updated.

4. The automatic firmware update method for an embedded system according to claim 1, wherein the step of performing the update procedure for updating the firmware to the new version comprises:
   reading the stored firmware in the new version;
   shutting down the application layer; and
   updating execution firmware of the application layer according to the read firmware in the new version after the application layer is shut down.

5. The automatic firmware update method for an embedded system according to claim 1, wherein the update policy is determined to be satisfied when:
   the power state of the embedded system indicates the embedded system to be in a non-low power state;
   the data synchronization status indicates that the embedded system is not performing data synchronization with the remote server; and
   the operation status indicates that a camera component of the embedded system is not performing a capturing operation or a stream storage operation.

6. An information extraction apparatus, comprising:
   a camera component, for capturing an ambient environment to generate an environment image stream presenting the ambient environment;
   a storage unit, for storing the environment image stream;
   a network module; and
   a processing unit, coupled to the storage unit and the network module, the processing unit comprising an application layer and a middleware, the application layer detecting a version of firmware stored in a remote server corresponding to an embedded system by using a network module, the application layer downloading and storing the firmware in a new version and an update policy in the storage unit when the firmware in the new version is available, and the middleware reading the update policy upon receipt of an update notification from the application layer, and after receiving the update notification, determining whether the update policy is satisfied, and in response to determining that the update policy is satisfied, performing an update procedure for updating the firmware to the new version according to the update policy, wherein the update policy includes a power state of the embedded system, a data synchronization status of the embedded system with the remote server, and an operation status of the embedded system, and the application layer issues the update notification prior to the middleware starting the update procedure.

7. The information extraction apparatus according to claim 6, wherein the processing unit further comprises a bootloader and a kernel, and the kernel receives a reboot instruction from the middleware when the update procedure is complete and executes the reboot instruction to enable the bootloader to perform a reboot procedure.

8. The information extraction apparatus according to claim 7, wherein the update procedure for updating the firmware to the new version comprises reading the stored firmware in the new version, updating execution firmware of the embedded system according to the read firmware in the new version, and outputting the reboot instruction after the execution firmware is updated.

9. The information extraction apparatus according to claim 6, wherein the update procedure for updating the firmware to the new version comprises shutting down the application layer, reading the stored firmware in the new version, and updating execution firmware of the application layer according to the read firmware in the new version.

10. The information extraction apparatus according to claim 6, wherein the update policy is determined to be satisfied when:
the power state of the embedded system indicates the embedded system to be in a non-low power state;
the data synchronization status indicates that the embedded system is not performing data synchronization with the remote server; and
the operation status indicates that a camera component of the embedded system is not performing a capturing operation or a stream storage operation.

11. An automatic firmware update system for an embedded system, comprising:
a storage unit;
an application layer, for establishing wireless communication therefrom with a remote server; wherein, the application layer detects a version of firmware stored in the remote server corresponding to the embedded system while the wireless communication is established, the application layer downloads the firmware in a new version and an update policy when the firmware in the new version is available, the application layer stores the downloaded firmware in the new version and the downloaded update policy in the storage unit, and the application layer issues an update notification according to an update object of the firmware in the new version; and
a middleware, for receiving the update notification from the application layer; wherein after receiving the update notification, the middleware reads the update policy upon receipt of the update notification, determines whether the update policy is satisfied, and in response to determining that the update policy is satisfied, performs an update procedure for updating the firmware to the new version according to the update policy,
wherein the update policy includes a power state of the embedded system, a data synchronization status of the embedded system with the remote server, and an operation status of the embedded system, and the application layer issues the update notification prior to the middleware starting the update procedure.

12. The automatic firmware update system for an embedded system according to claim 11, further comprising:
a bootloader; and
a kernel, for receiving a reboot instruction from the middleware when the update procedure is complete, and executing the reboot instruction to enable the bootloader to perform a reboot procedure.

13. The automatic firmware update system for an embedded system according to claim 12, wherein the kernel comprises an event control element, and the event control element executes the reboot instruction to enable the bootloader to perform the reboot procedure.

14. The automatic firmware update system for an embedded system according to claim 12, wherein the update procedure for updating the firmware to the new version comprises reading the stored firmware in the new version, updating execution firmware of the embedded system according to the read firmware in the new version, and outputting the reboot instruction after the execution firmware is updated.

15. The automatic firmware update system for an embedded system according to claim 11, wherein the update procedure for updating the firmware to the new version comprises reading the stored firmware in the new version, shutting down the application layer, and updating the execution firmware of the application layer according to the read firmware in the new version.

16. The automatic firmware update system for an embedded system according to claim 11, wherein the application layer comprises a network management element, and the network management element establishes therefrom wireless communication with the remote server and determines whether the remote server has the firmware in a new version corresponding to the embedded system while the wireless communication is established.

17. The automatic firmware update system for an embedded system according to claim 11, wherein the middleware comprises a service element, and the service element performs an update procedure for updating the firmware to the new version according to the update policy upon receipt of the update notification.

18. The automatic firmware update system for an embedded system according to claim 11, wherein the update policy is determined to be satisfied when:
the power state of the embedded system indicates the embedded system to be in a non-low power state;
the data synchronization status indicates that the embedded system is not performing data synchronization with the remote server; and
the operation status indicates that a camera component of the embedded system is not performing a capturing operation or a stream storage operation.

* * * * *